United States Patent [19]
Leeper

[11] Patent Number: 4,765,011
[45] Date of Patent: Aug. 23, 1988

[54] MECHANISM TO TRANSFER A FOOTWEAR UPPER ASSEMBLY BETWEEN STATIONS OF A MULTI-STATION SYSTEM

[75] Inventor: Alan L. Leeper, Nashua, N.H.

[73] Assignee: International Shoe Machine Corporation, Nashua, N.H.

[21] Appl. No.: 7,880

[22] Filed: Jan. 28, 1987

[51] Int. Cl.⁴ .............................................. A43D 11/00
[52] U.S. Cl. ........................................ 12/1 A; 12/1 R
[58] Field of Search ................... 12/1 A, 1 R, 4.6; 414/732, 744 A, 783, 751, 753, 763, 729, 772, 773, 776; 901/8, 31

[56] References Cited

U.S. PATENT DOCUMENTS

| | | | |
|---|---|---|---|
| 3,033,059 | 5/1962 | Melton et al. | 414/744 |
| 3,951,271 | 4/1976 | Mette | 414/744 A |
| 4,042,122 | 8/1977 | Espy et al. | 414/783 |
| 4,062,455 | 12/1977 | Flatau | 414/744 A |
| 4,273,506 | 6/1981 | Thomson et al. | 414/744 A |
| 4,274,802 | 6/1981 | Inaba et al. | 414/783 |
| 4,557,386 | 12/1985 | Buckley et al. | 209/556 |
| 4,599,759 | 7/1986 | Price et al. | 12/1 A |
| 4,606,696 | 8/1986 | Slocum | 414/744 R |
| 4,652,204 | 3/1987 | Arnett | 414/744 A |
| 4,676,002 | 6/1987 | Slocum | 33/1 MP |

FOREIGN PATENT DOCUMENTS

| | | | |
|---|---|---|---|
| 0048904 | 4/1982 | European Pat. Off. | 414/732 |
| 2666635 | 1/1986 | France | 12/1 A |
| 0837852 | 6/1981 | U.S.S.R. | 414/732 |

Primary Examiner—Steven N. Meyers
Attorney, Agent, or Firm—Robert Shaw

[57] ABSTRACT

A transfer machine to move a footwear upper assembly (or the like) between stations in a footwear (or the like) processing system which transfer machine includes an end effector having a mechanism to grasp the footwear upper assembly. A base serves as a reference in an X-Y-Z coordinate system with respect to which positions of the footwear upper assembly are known during movement of the footwear upper assembly within the footwear processing system. An interconnecting mechanism connects the end effector to the base and provides seven degrees of freedom to the mechanism to grasp with respect to said base; three translational degrees of freedom along the X-Y-Z axes of the transfer machine, a pivotal degree of freedom with respect to the base about the Y-axis, a tilting degree of freedom about the X-axis, a pivotal degree of freedom about the Z-axis, and a further pivotal degree of freedom about the Y-axis.

14 Claims, 7 Drawing Sheets

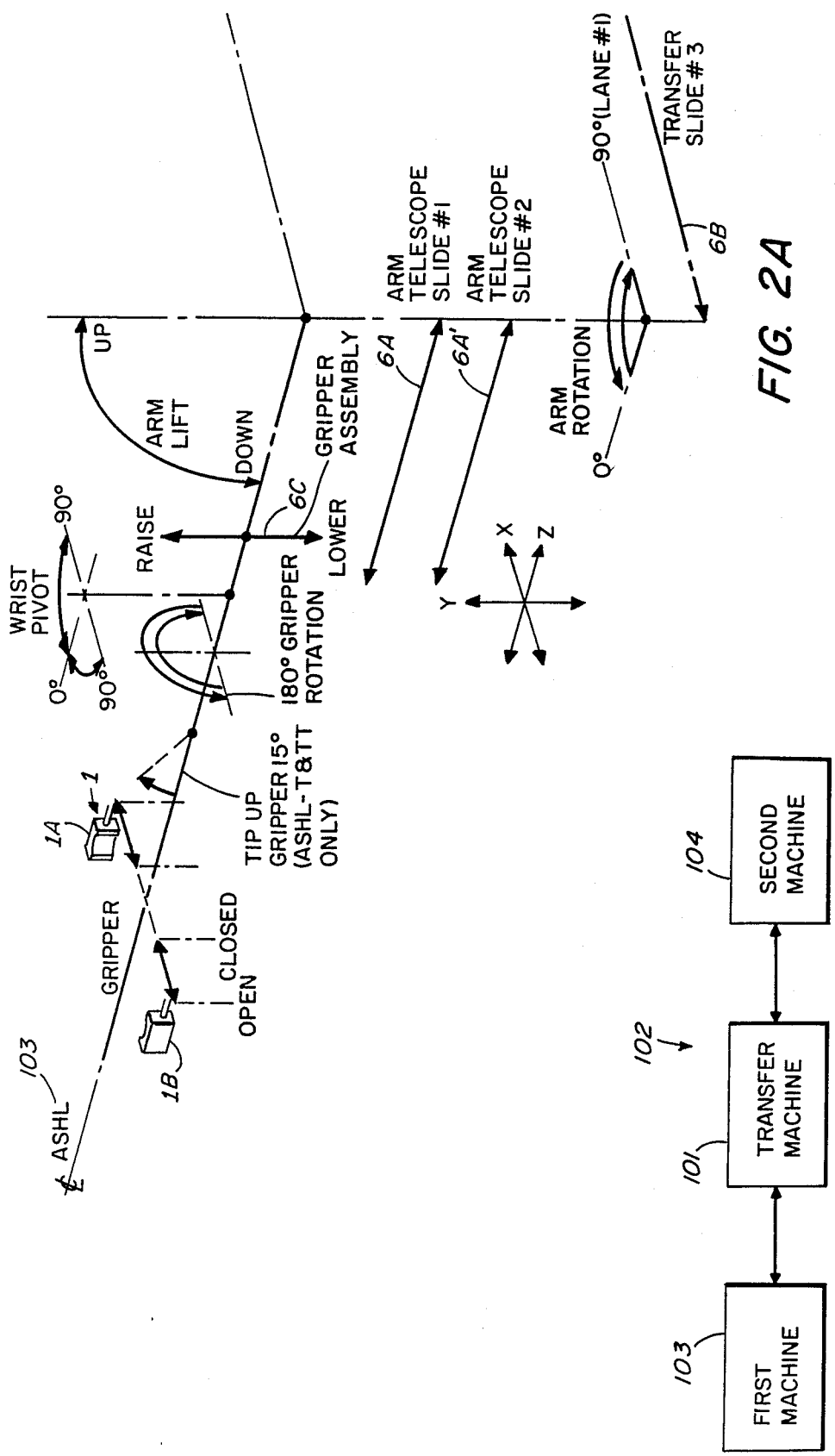

MECHANISM TO TRANSFER A FOOTWEAR UPPER ASSEMBLY BETWEEN STATIONS OF A MULTI-STATION SYSTEM

The present invention relates to mechanisms to transfer a footwear upper assembly between stations of a multi-station system in which the footwear upper assembly is subjected to operations thereon.

In this specification emphasis is placed on shoe upper assemblies, but it is to be understood that the context is to footwear upper assemblies more generally and the transfer mechanism has more general application. The shoe industry is one in which shoe parts in the course of fabrication are human-intensive. A significant portion of the cost of a fabricated shoe is found in the human operations performed on that shoe and this is particularly true in the developed countries. In an effort to reduce this aspect of shoe costs, developed nations, in particular, have sought mechanisms that reduce the labor costs in a shoe.

One way to reduce that labor cost is to automate transfer of a shoe upper assembly between stations in a multi-station system. This transfer is not particularly easy because processing machines have been developed in a way that accommodates human operation. These machines are many and in use every day. Thus, a typical side and heel lasting machine (ASHL) has a physical configuration wherein a shoe upper assembly is presented at a height and angle that accommodates a human operator. If one is to automate that operation and assimilate it in a multi-station system, one must accept the present existing machine, even though that machine might be structured differently in a totally new system.

Accordingly, it is an objective of the present invention to provide a transfer mechanism that is adapted to move a shoe (or other footwear) upper assembly between stations of a multi-station system wherein operations are successively performed on the upper assembly.

Another objective is to provide a transfer mechanism that is versatile in that it accommodates existing shoe machines and is able to achieve transfer between stations made up of such existing machines.

Still another objective is to provide a transfer mechanism that can perform its functions with precision.

A still further objective is to provide a transfer machine of more general nature.

These and still further objectives are addressed hereinafter.

The foregoing objectives are attained, generally, in a transfer machine to move a footwear upper assembly between stations in a footwear processing system. The transfer machine includes an end effector having a gripper mechanism to grasp the footwear upper assembly; a base that serves as a reference in an X-Y-Z coordinate system with respect to which positions of the footwear upper assembly are known during movement of the footwear upper assembly within the footwear processing system; and an interconnecting mechanism that connects the end effector to the base and provides seven axes for movement of the gripper mechanism with respect to the base: three translational movements along the X-Y-Z axes of the transfer machine, pivotal movement with respect to the base about the Y-axis, tilting movement about the X-axis, pivotal movement about the Z-axis, and further pivotal movement about the Y-axis. In the figures the Y-axis is a vertical axis and the X and Z axes are horizontal. The X-Z plane is considered for explanation purposes to be horizontal.

The invention is hereinafter described with reference to the accompanying drawing in which:

FIG. 1 is a block diagram representation of a system that includes a transfer machine according to the present invention to move a shoe (or other footwear) upper assembly from a first machine to a second machine;

FIGS. 2A and 2B together present, schematically, a system that includes the transfer machine of FIG. 1 as well as the first machine and the second machine;

Figure 2B:
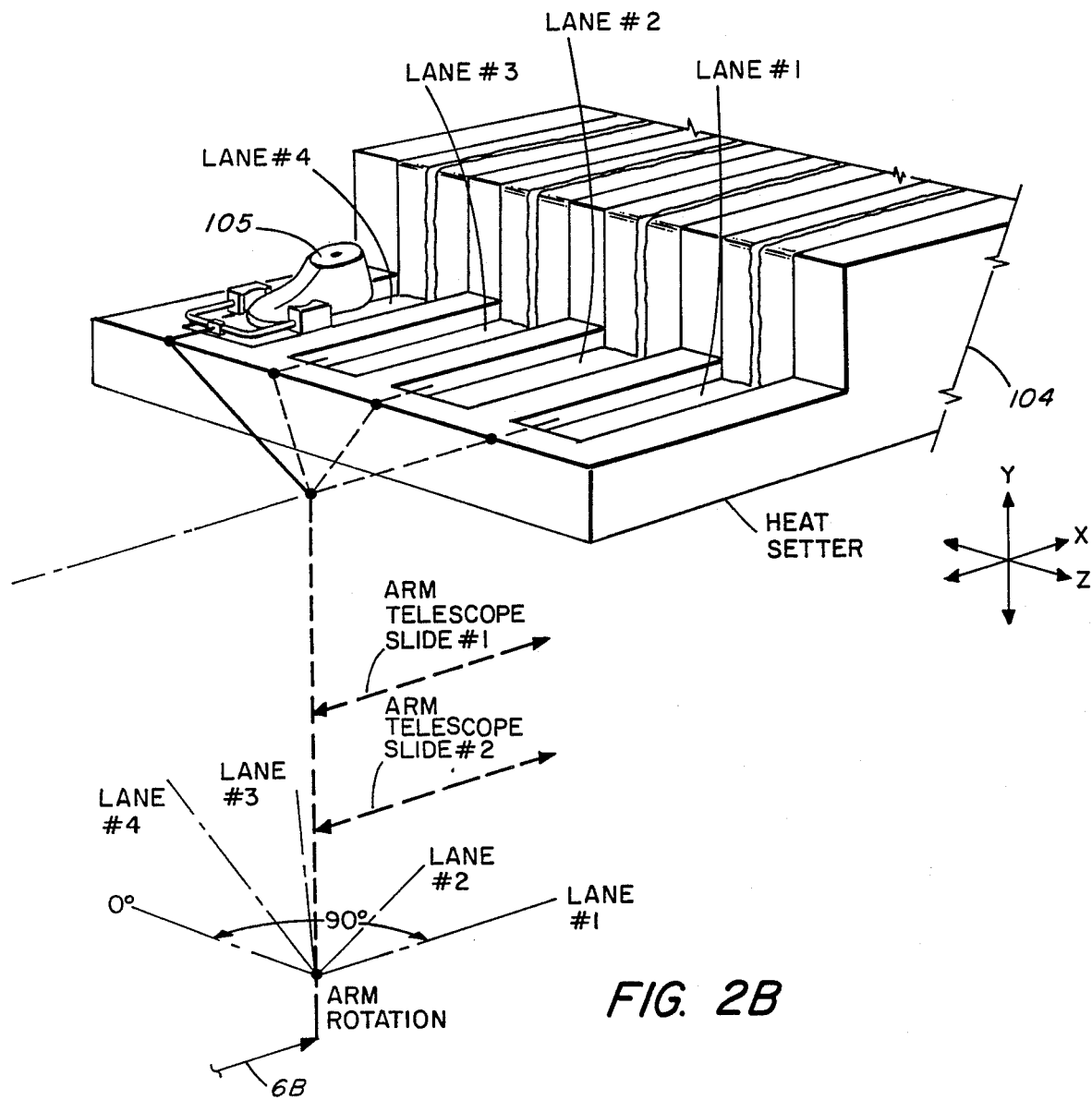

Before entering a detailed explanation of the transfer machine labeled 101 in the figures, a few comments, general in nature, with respect to the transfer machine may be useful. As is indicated previously herein, it is intended that the machine 101 be versatile, rather than dedicated. Hence it is (or can be) free standing and can be moved from one footwear processing machine to another (see FIG. 7). (It may be necessary to connect the transfer machine to the machines with which it is being used to avoid vibrational movement.) For example, in the multi-station system labeled 102 in FIG. 1, the transfer machine 101 may be employed to move a footwear upper assembly 105 in FIG. 2B from a first machine 103, e.g., a side and heel laster or ASHL (see, for example, U.S. Pat. No. 4,553,281, Vornberger) to a second machine 104, e.g., a multi-lane heat setter (see an application for U.S. Patent Ser. No. 933,659, filed Nov. 21, 1986, Williams); heat setters are known in this art. Typically, the upper assembly 105 has been toe and ball lasted prior to being introduced to the side and heel laster 103 which performs a further lasting operation on the upper assembly. Typically, also, the orientation of the upper assembly 105 is horizontal but may be tilted toe up at about fifteen degrees from the horizontal and, because of the conventions in the shoe industry, is located some distance above or below level of the heat setter 104. In the context of this specification, an effector 1, having fingers 1F and 1G in FIG. 3 to grasp the upper assembly 105, is moved about in an X-Y-Z coordinate system in which Y is vertical and the X-Z plane is the horizontal plane, it being understood that vertical need not be precisely up-down and horizontal need not be precisely parallel to the floor.

Figure 6:
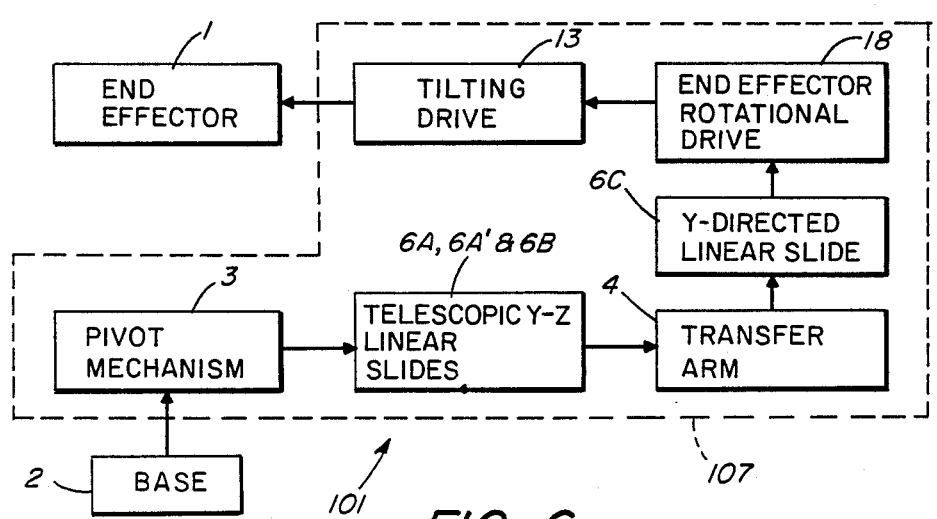
FIG. 6 is a block diagram of the transfer machine of FIG. 1.
Figure 7:
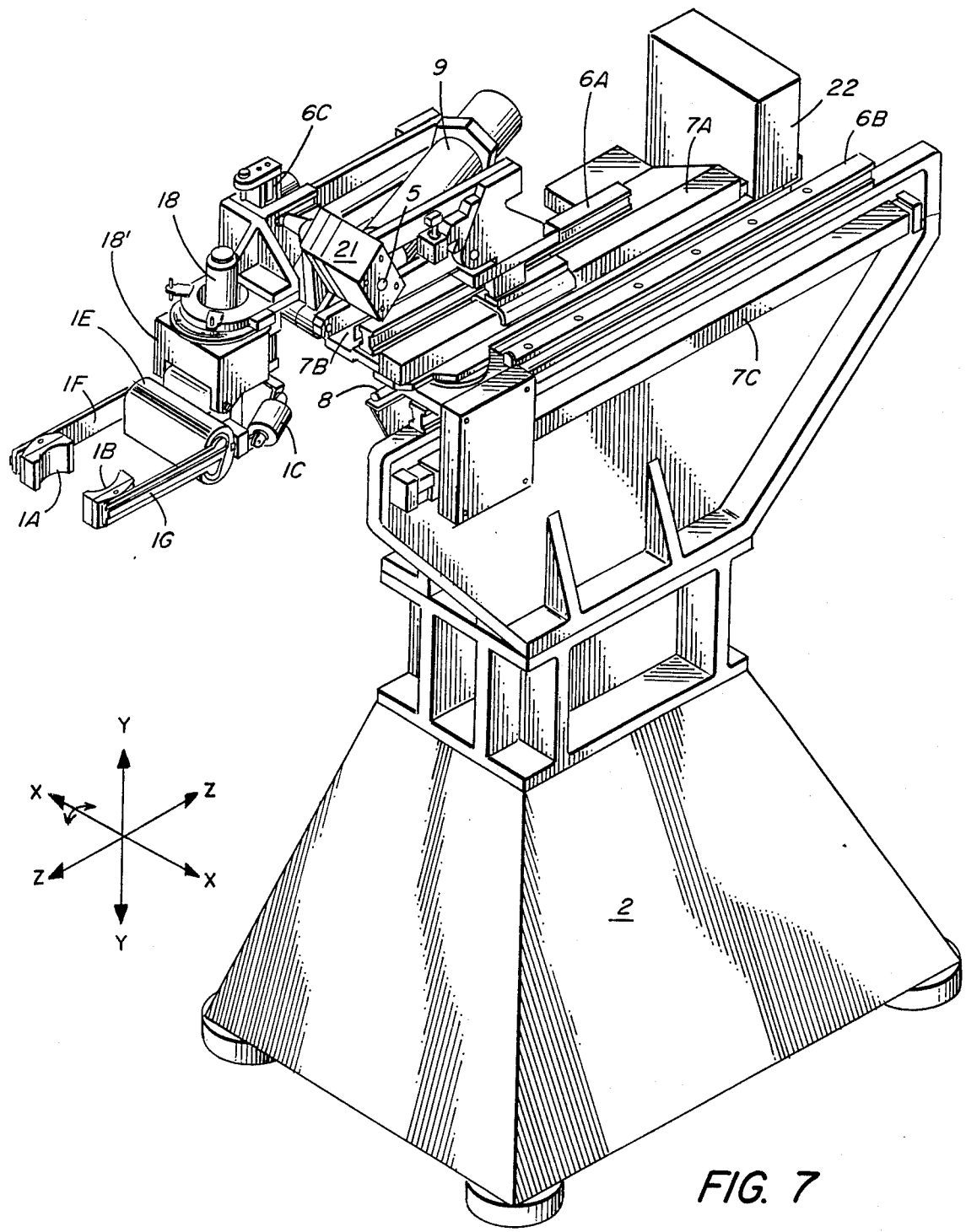
FIG. 7 is an isometric view showing the transfer machine of FIG. 1.

A base 2 in FIGS. 6 and 7 serves as a reference in the X-Y-Z coordinate system; the base 2 is hollow and serves to house electrical control and and other circuit elements of the machine 101. For now what is important is that the end effector 1 be moved in a way necessary to grasp the upper assembly 105 after it has been processed by the first machine 103 and move that upper assembly to the second machine 104.

Figure 5:
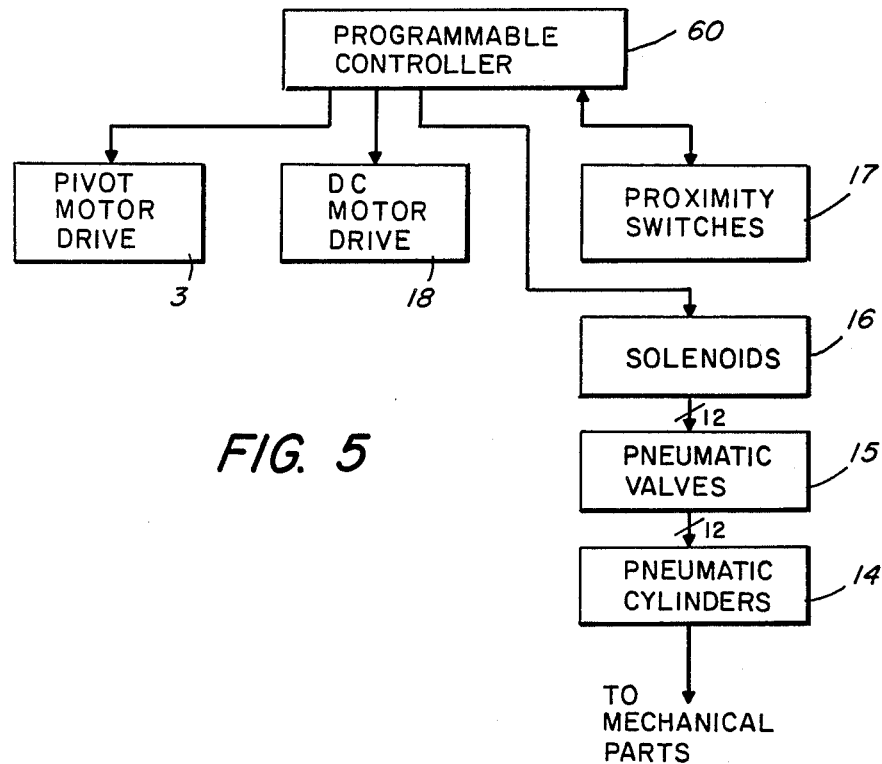
FIG. 5 is a block diagram showing electrical and pneumatic parts of the transfer machine.

The transfer machine 101 in the figures is shown with the end effector (or gripper assembly) 1 in a number of orientations which are established by the programmable controller shown at 60 in FIG. 5. When the shoe upper assembly is placed in the shoe laster 103, the controller 60 directs the end effector of the transfer machine 101 to a position relative to the machine 103. At that time the machine 101 is inoperative and awaits a signal from the first machine 103 to render it operative. The first machine 103 includes a signaling device that indicates that the upper assembly 105 has been operated upon, the signaling device being connected to introduce a control input to the controller 60 to render the transfer machine 101 operative to remove the shoe upper assembly 105 from the first machine 103 and deliver it, automatically—with proper orientation and position—to the second machine 104 for operation thereupon by the second machine.

Figure 8:
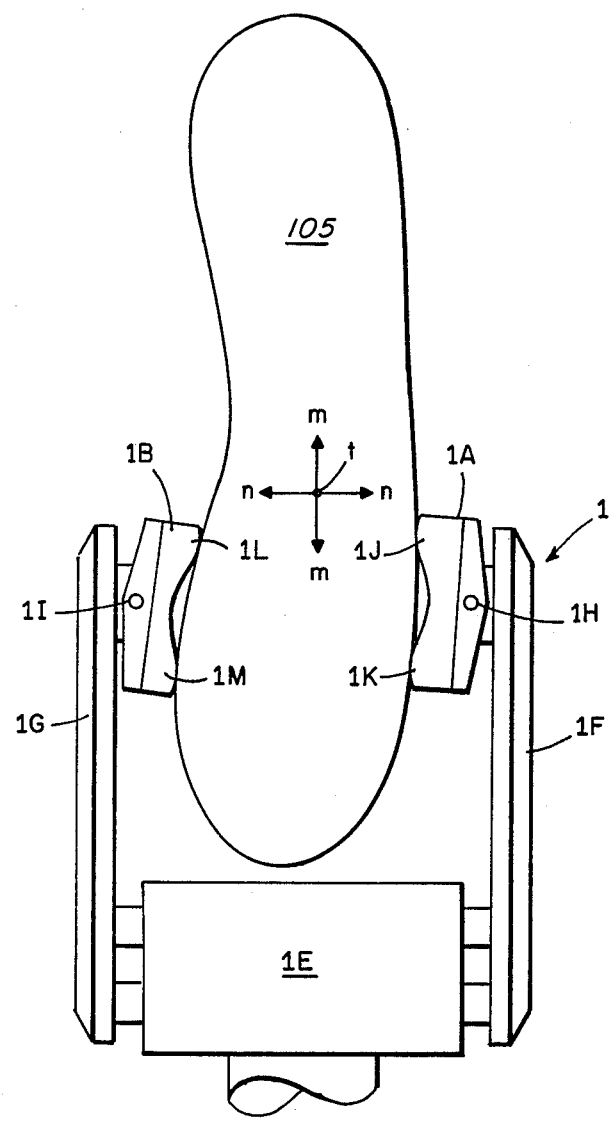
FIG. 8 is a plan view showing a footwear upper assembly grasped by a gripper in the transfer machine of FIG. 1.

At this juncture it may be useful to point out that in some respects shoe machines resemble machine tools in their functions but are also quite different from machine tools. In particular a shoe upper assembly requires many intricate operations which must be accomplished with precision and which require fairly high forces of various nature; but, unlike a metal piece that is being machined, a shoe upper is delicate and can be easily scuffed, wrinkled or otherwise deformed Such shoe uppers are made of leather or man-made materials that can take set; furthermore the color applied is usually a surface film that is receptive to scratching. Shoe uppers have irregular contours, as shown in FIG. 8. A shoe machine must, therefore, grasp or otherwise address a shoe upper assembly in a way that is firm but not in a way that mars the upper assembly. Furthermore, in shoe making many shoe sizes, shapes, styles and the like must be formed in the same system group. Hence any transfer mechanism must accommodate shoe upper assemblies in many forms, including boots, and yet perform with the required precision. Versatility, then, is needed in anything other than a dedicated transfer machine and precision is also needed. The present invention is versatile, as now explained.

The end effector or gripper 1, as later explained in detail, is connected to the base 2 by an interconnecting mechanism 107 in FIG. 6 and elsewhere that provides movements in the illustrative machine with respect to seven axes for the fingers 1F and 1G relative to the base 2: three translational axes along the X-Y-Z axes of the transfer machine 101, pivotal movement with respect to the base 2 about the Y-axis, a tilting about the X-axis, a pivotal movement about the Z-axis, and a further pivotal movement about the Y-axis. It is shown below that the interconnecting mechanism 107 includes a telescopic transfer arm 4 that includes a four-bar linkage 4A, 4B, 4C and 4D that is pivotable at 5 and 5a to pivot the end effector 1 about the pivots 5 and 5a. The four-bar linkage or transfer arm 4 pivots the end effector 1 in a way that the fingers 1F and 1G are always parallel to the horizontal (i.e., the floor or some other plane of reference). The four-bar linkage is typically capable of a 90-degree pivot of the end effector 1, from a position wherein the linkage is horizontal (i.e., in the X-Z plane) to a position wherein the linkage is vertical (i.e., in the Y-direction). The above-mentioned pivotal movement with respect to the Y-axis is substantially coaxial pivoting of the arm when that arm is raised to the vertical; otherwise the arm is swung clockwise or counterclockwise about the Y-axis. With the foregoing in mind the various further structures needed to achieve the movement of the end effector 1 are now discussed.

It is noted above that the end effector 1 is movable translationally in the X-Y-Z direction. This translational movement is best effected in each direction by what is termed a "linear guideway". The "linear guideway" is most important aspect of the present invention. The actual apparatus used is manufactured and marketed by Tychoway Bearings Company, a Cross & Trecker Company, 9432 Southern Pine Boulevard, Charlotte, N.C., 28210. It is understood that when the term "linear guideway" is used herein, it refers to a guideway marketed by Tychoway Bearing Company, or equal.

The transfer machine 101 is shown diagrammatically in FIG. 6. The machine 101 functions to remove the upper assembly 105 from the first machine 103 in FIG. 1 and to deliver it automatically to the second machine 104 which, in this illustrative showing, is a heat setter which is known in this art (see FIG. 2B). The transfer machine 101 must be able to adjust for height differences between the machine 103 and machine 104, position errors due for differing styles and sizes of shoe, variations in last sizes and discrepancies from shoe upper assembly 105 to shoe upper assembly. Furthermore, typically the upper assembly 105 will have one spatial orientation in the machine 103 and another spatial orientation in the machine 104. Further, as noted elsewhere herein, the height of the workplace may, and usually does, differ from machine to machine. The overall operation of the machine 101 and the system 102 is discussed now, mostly with reference to FIGS. 5 and 6.

The reference for movement of the end effector 1 is, then, the base 2 and the various movements of the end effector is with respect to that base. Those various movements are now explained beginning with the pivotal movement of the end effector at the base 2 and with respect thereto. The various movements of the end effector 1 are effectuated and controlled by the programmable controller 60 in FIG. 5. Pivotal movement between the arm 4 and the base 2 is effected by a pivot motor drive 3 (e.g., a gearmotor with a servomotor drive) which pivots the arm 4 through 360 degrees more or less about its axis of rotation angularly in the X-Z plane about the Y-axis. This is designated "arm rotation" in FIG. 2A.

The end effector is also movable translationally along the X-Y-Z direction, this time by the linear guideways designated 6A, 6A', 6B and 6C in FIG. 2A, and elsewhere, to represent guideways that move the end effector 1 in the Z-direction (i.e., by guideways 6A and 6A'), the X-direction (i.e., by guideway 6B) and the Y-direction (i.e., by guideway 6C), respectively. Translational movement in the X and Z directions is activated by rod-less pneumatic cylinders 7A, 7B and 7C, generally included in the box labeled 14 in FIG. 5. A rotary activator 21 (also within the block 14) in FIG. 7 through a Scotch yoke arrangement provides Y travel of the guideway 6C. The cylinders 7A, 7B and 7C provide translational forces to the linear guideways 6A, 6A' and 6B to drive the end effector in the X-Z directions. The linear guideways 6A and 6A' form a two-stage structure which typically can extend the end effector up to about a meter in the Z-direction: the first stage 6A carries the second stage 6A' about half the extension distance. The second stage 6A' then carries the end effector 1 the rest of the way.

The linear guideway consists of a recirculating ball arrangement and bearing surface with opposing 45° guideways ground into a rail which provides a mechanism capable of accepting large twisting forces. Angular bearings handle high overhang loads and keep deflection down. A stabilizer shaft 8 acts to reduce deflection of the arm 4 due to overhang torques, thereby rendering the arm 4, and hence the effector 1, relatively accurately positioned, relative to the upper assembly 105, despite fairly high cantilever forces on the arm 4.

Figure 3:
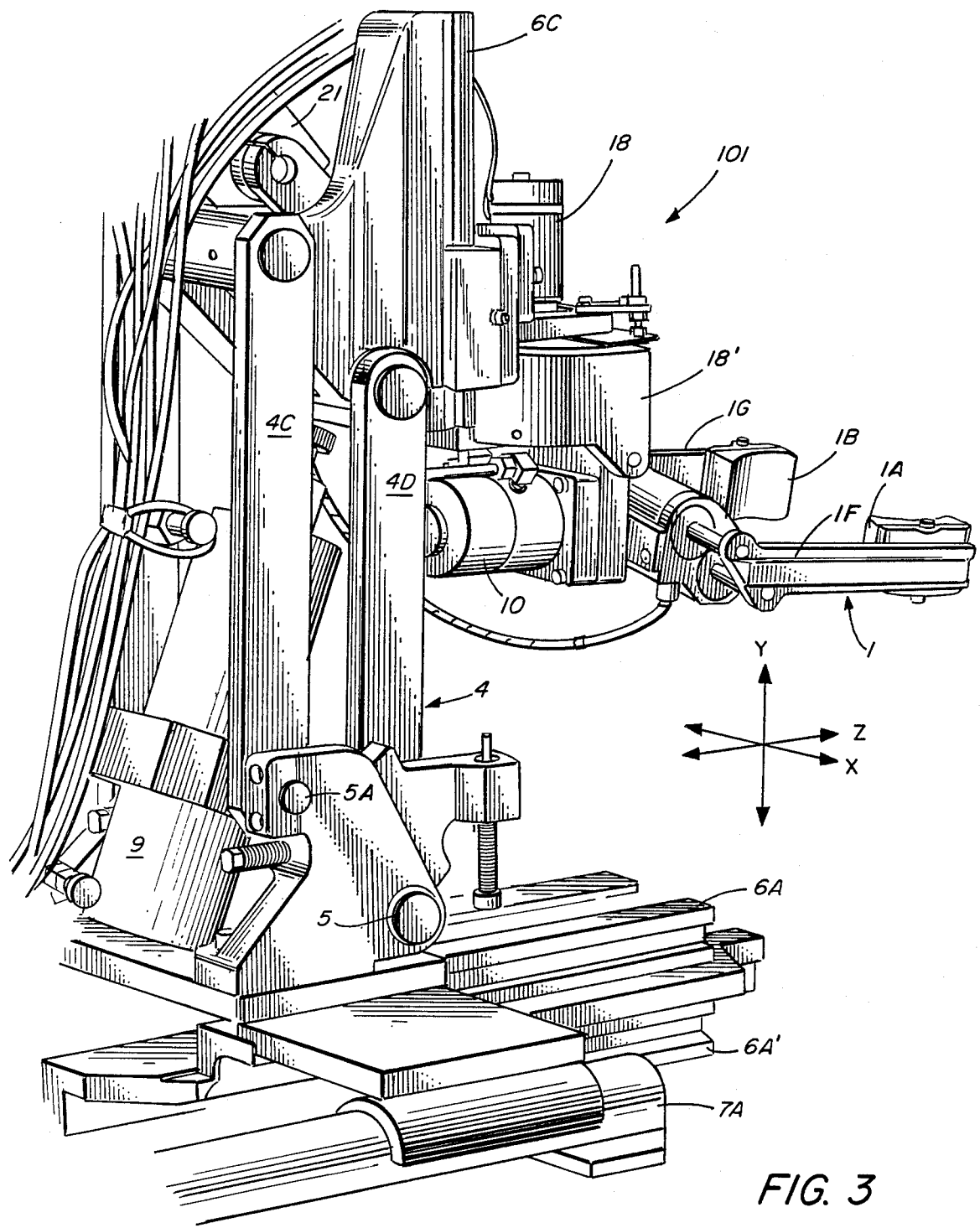
FIG. 3 is an isometric view of the transfer machine of FIG. 1.
Figure 4:
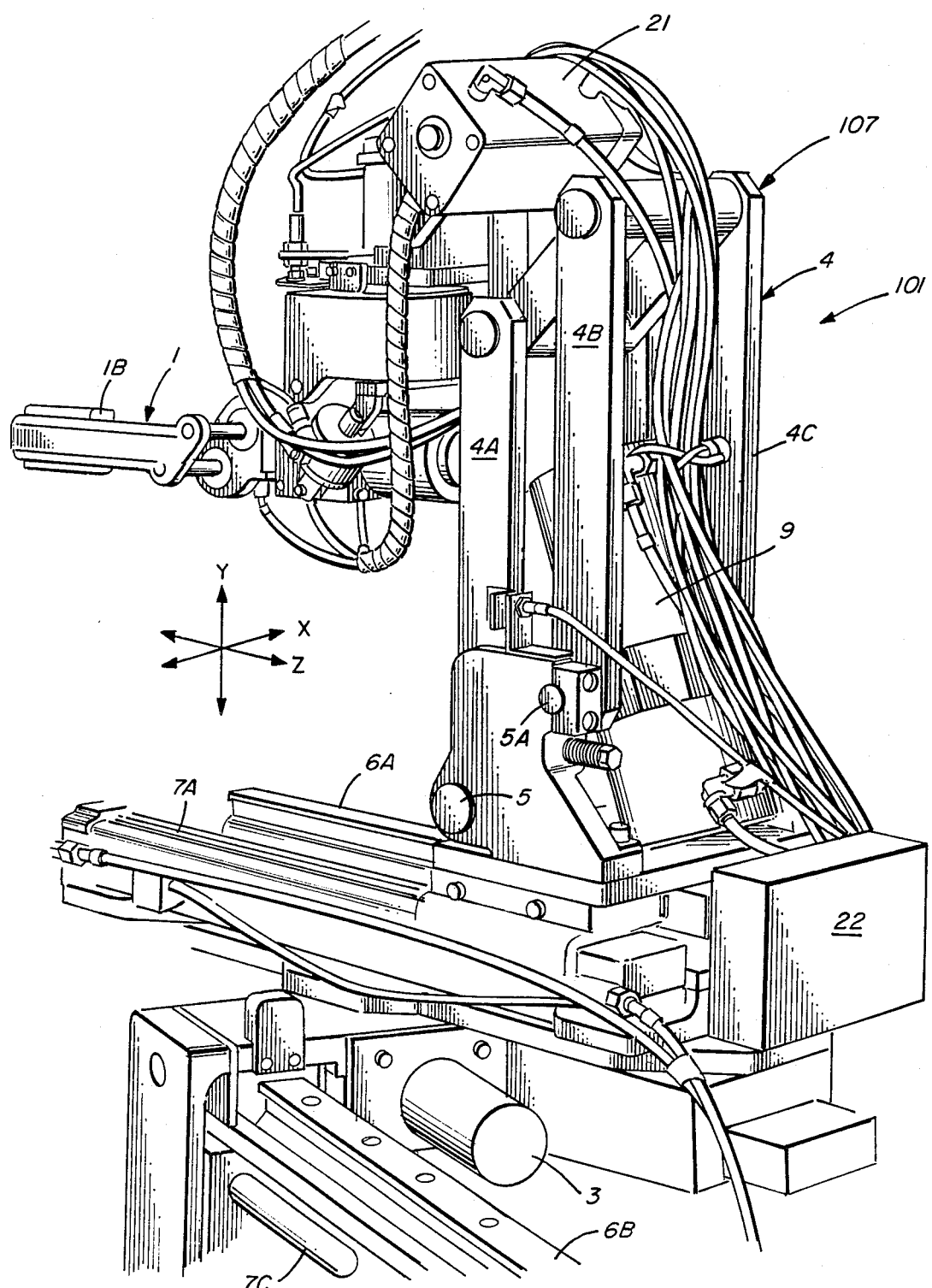
FIG. 4 is another isometric view of the transfer machine taken from the other side thereof.

To proceed with the overall explanation of the machine 101, the arm 4 is rotatable about the Y-axis (see "Arm Rotation" in FIG. 2A), thereby providing angular movement of the end effector 1 about the Y-axis at the center line of the arm 4 when the arm 4 is vertically oriented; the arm 4 is pivotal at 5 by an air cylinder 9 in FIG. 4 (i.e., one of the pneumatic cylinders in the block labeled 14 in FIG. 6) to pivot the arm in the Y-Z plane; tilting movement of the end effector 1 with respect to the base 2 about the X-axis is achieved by the air cylinder (or other) drive 1C in FIG. 7; pivotal movement of the end effector 1 about the X-axis is achieved by a rotary air cylinder (or by a servomotor) 10 in FIG. 3 about the Z-axis; and a further pivotal movement of the end effector 1 about the Y-axis by a servomotor or a d-c motor 18 in FIGS. 3 and 7 which rotates a bearing housing 18' that supports the gripper assembly 1. In the context of human movement of a hand which is equivalent to the end effector 1, the first pivotal movement of the end effector (i.e., the hand) might be analogously equal to shoulder movement; translational motion is in an X-Z plane; rotational movement about the Z-axis is achieved; and pivoting of the end effector about its own Y-axis is provided. Raising and lowering of the end effector is achieved by the linear guideway 6C in FIG. 2A, and elsewhere, to accommodate differences in height between the work stations 103 and 104 in FIG. 1. This is achieved by the rotary actuator 21 through a Scotch-yoke arrangement. In the foregoing way the end effector 1 is movable about seven axes to accommodate particular angles and positions of the upper assembly 105 in the machine 103 and its position in the machine 104.

In the machine 101 most of the electrical elements of the programmable controller 60 are located within the base 2, but boxes 22 and 23 in FIG. 7 contain circuitry; proximity switches 17 in FIG. 5 are appropriately located within the mechanism 107; the pivot motor 3 drives the arm 4 about its axis; the air cylinder labeled 9 in FIG. 4 pivots the arm 4 about the pivots 5 and 5a the proximity switches 17 control solenoids 16 which, in turn, control the various pneumatic valves in the block 15 which, in turn control pneumatic cylinders in the block 14. The pneumatic (i.e., air cylinders) have individual labels in other figures.

With respect to FIG. 6 the pivot mechanism 3 includes the servomotor but it includes, as well, a right angle gear mechanism; the block 6A ... includes the linear slides, but also some of the pneumatic cylinders in the block 14 of FIG. 5, some of the pneumatic valves 15, some of the solenoids 16, and so forth. In other words, the block diagram of FIG. 6 should be considered as a functional block diagram, as should, also, the block diagram of FIG. 5.

The gripper assembly 1 includes the gripper fingers 1F and 1G in FIG. 8. Tilting of those fingers is achieved by the air cylinder 1C in FIG. 7. The rotary actuator 10 in FIG. 3 rotates the gripper fingers 180 mechanical degrees about the longitudinal axis of the upper assembly 105 in FIG. 8; that axis is the m-m axis of the gripper assembly 1 in FIG. 8. The gripper assembly 1 is pivotally attached to the actuator arm assembly 4 by a transverse axis or pivot to permit tilting of the gripper assembly through an arc of about fifteen mechanical degrees. The pivoting is achieved, as above noted, by the air cylinder 1C in FIG. 7 the axes labeled m-m, n-n and t in FIG. 8 are respectively the longitudinal axis, the transverse axis and the thickness axis of the upper assembly 105.

Mention is made above to the three axes in FIG. 8 with respect to the upper assembly 105. It is essential for present purposes that each assembly 105 be grasped in a secure manner with an orientation in all planes that is the same from assembly 105 to assembly 105. Toward this end the pair of fingers 1F and 1G have jaws 1A and 1B in FIG. 8, respectively, secured to the inside of the associated fingers and positioned to contact the footwear upper assembly 105 at the ball region thereof; the gripper jaws 1A and 1B are moved toward and away from each other by the air cylinder 1E respectively to grasp and release the upper assembly 105. The gripper jaws 1A and 1B pivot at 1H and 1I, respectively, so that longitudinally spaced projections 1J–1K and 1L–1M of the jaws (or pads) 1A and 1B, respectively, can grasp the upper firmly at two longitudinally spaced points of contact, that is, spaced in the longitudinal direction along the m—m axis of the upper assembly 105. Pivoting of the jaws about the 1H and 1I axis is about the thickness axis t. The important issue here is that the position of the upper assembly 105, when grasped, relative to the gripper 1 be known with acceptable accuracy and that the upper assembly be grasped securely, yet without marring the outer upper surface. The jaws 1A and 1B are made of a plastic (urethane) material whose durometer is low enough to prevent marring of the upper yet high enough to grasp securely the upper assembly. The low durometer also permits deformation of the pad thereby to conform to the irregular shape profile of the upper assembly, at and near the four contact points or projections 1J ... 1M. In this way a larger surface area of contact between the projections 1J ... and the ball region of the upper assembly 105 can be achieved. The projections 1J ... must be separated longitudinally from one another a sufficient distance that the footwear upper assembly does not pivot with respect to the jaws, that is, about the n-n axis in FIG. 8. The upper assembly 105 is rotatable through 180 degrees about its longitudinal axis prior to presentation to the second machine 104.

Thus the transfer machine 101 functions to grasp the upper assembly 105 after it has been operated upon by its first machine 103 and deliver it automatically to the second machine 104 for further operations thereon. The machine 101 is adjustable to interface with the first machine 103 as well as the second machine 104. It grasps the upper assembly 105 gently, yet firmly, and it accommodates both shoes and boots with their tube-like extensions. Further it is adjustable and adapted to take into consideration varying levels of work stations between the first machine 102 and the second machine 104, orientations of the work stations between the first machine 102 and the second machine 104 and the fragile nature of the upper assembly 105.

A most important aspect of the present invention is the rotatable nature of the arm 4 about the Y-axis by the pivot motor drive 3 for this moves the upper 105 very fast between the machine 103 and 104. Indexing of the upper 105 in FIG. 4 with lanes #4, #3, #2 and #1 in the heat setter 104 in FIG. 2B is expedited thereby. Orientation of the upper 105 at each lane first is effected by the rotation of the upper about its longitudinal axis and then by wrist movement by the d-c motor 18 in FIG. 7 to achieve X-Z plane orientation with respect to the particular X-directed lane of the heat setter 104. The angles of movement to achieve this end are shown schematically in FIG. 2B and the showing is self-explanatory.

A number of matters noted before are taken up here for emphasis. The connection between the base 2 and the gripper assembly 1 includes pivoting action, translational action (i.e., X-Y-Z), rotation action and tilting action. Two of those actions are emphasized: the angular movement of the gripper assembly due to pivoting of the gripper with respect to the base 2 achieves rapid movement of the upper assembly 105 from the machine 103 to the machine 104: the vertically oriented guideway 6C is disposed between the transfer arm 4 and the end effector or gripper assembly 1. It is drivenby the rotary actuator 21 to raise and lower the end effector 1 to adjust to levels between stations of the machine 103 and the machine 104, a function that can be achieved under the direction of the controller 60, between stations. It is noted above that the transfer machine 101 is versatile, rather than dedicated; this latter capability—together with other capabilities noted before—enhances versatility.

The activator arm assembly 4 can move ninety or more mechanical degrees about the transverse axis 5. The activator arm 4 includes the four-bar linkage consisting of the mechanical linkages 4A, 4B, 4C and 4D whose purpose it is to hold the gripper assembly at a predetermined and non-varying orientation, e.g., with its longitudinal axis parallel to the machine base (typically this is parallel to the floor) during arm extension and retraction, that is, extending to grasp the upper assembly 105 and moving it to the second machine 104. The fifteen degree tilting action noted above is necessary because sometimes the side laster supports the upper assembly 105 at a fifteen degree angle during side lasting, as is common in this industry. The air cylinder 9 in FIG. 4 (or an electric actuator drive can be used) serves to extend and retract the activator assembly arm 4 by pivoting about the transverse axis 5. The stepper motor 3 moves the activator assembly arm 4 about the Y-axis in the figures through ninety mechanical degrees (or more if needed) to achieve alignment with the heat setter 104. That alignment is perfected by the "wrist" action of the end effector about the Y-axis, driven by the end effector rotational drive 18 in FIG. 6. The various movements needed to achieve registration and alignment of the upper assembly 105 with the lanes #4 ... are illustrated very well in FIG. 2B.

Further modifications of the invention herein disclosed will occur to persons skilled in the art and all such modifications are deemed to be within the scope of persons skilled in the art.

What is claimed is:

1. A transfer machine to move a footwear upper stations in a footwear processing system, said transfer machine comprising:
   an end effector having means to grasp the footwear upper assembly;
   a base serving as a reference in an X-Y-Z coordinate system with respect to which positions of the footwear upper assembly are known during movement of the footwear upper assembly within the footwear processing system; and
   an interconnecting mechanism that connects the end effector to the base and provides seven axes for movement of said means to grasp with respect to said base, three translational movements along the X-Y-Z axes of the transfer machine, pivotal movement respect to the base about the Y axis, a tilting movement about the X-axis, pivotal movement about the Z-axis, and further pivotal movement about the Y-axis.

2. A transfer machine according to claim 1 in which the interconnecting mechanism includes a four-bar linkage transfer arm.

3. A transfer machine according to claim 2 which includes a telescoping slide mechanism disposed between the base and the transfer arm.

4. A transfer machine according to claim 3 in which the telescoping slide mechanism is in the form of a two-stage slide, each slide in the form of a linear guideway.

5. A transfer machine according to claim 4 having a bearing block that supports the telescoping slide mechanism upon the base to permit pivoting of the telescoping slide with respect to the base.

6. A transfer machine according to claim 5 that includes an electric motor drive connected to drive the telescoping slide mechanism in pivoting movement with respect to the base.

7. A transfer machine according to claim 6 in which the electric motor is a stepper motor.

8. A transfer machine according to claim 6 in which the electric motor is a servomotor.

9. A transfer machine according to claim 6 in which the telescoping side mechanism includes a stabilizing shaft to absorb mechanical shock waves upon the overhung transfer arm.

10. A transfer machine according to claim 9 that includes a scotch yoke mechanism that connects rotary motion to linear motion along the Y-axis.

11. A transfer machine according to claim 6 that includes a vertical guideway disposed between the transfer arm and the end effector to raise and lower the end effector to adjust to levels between said stations.

12. A transfer machine according to claim 11 that includes an electric motor drive connected to rotate the end effector about the Y-axis, said further pivotal movement to serve as wrist movement to compensate for the pivoting motion at the base.

13. A transfer machine according to claim 12 that includes a tilt drive to tilt the end effector about the X-axis.

14. A transfer machine to move a footwear upper assembly between stations in a processing system, that comprises:
   an end effector having means to grasp the footwear upper assembly, said end effector being movable about seven axes to accommodate particular angles and positions of the footwear upper assembly;
   a base serving as reference in an X-Y-Z coordinate system with respect to which positions of the footwear upper assembly are known during movement of the footwear upper assembly within the processing system; and
   an interconecting mechanism that connects the end effector to the base in a manner that permits orientation, horizontal positioning and vertical positioning of the footwear upper assembly with respect to said stations and relative to said seven axes by movement which includes movement along three translational axes, the X-Y-Z axes of the transfer machine, pivotal movement with respect to the base about the Y-axis, tilting movement about the X-axis, pivotal movement about the Z-axis and a further pivotal movement about the Y-axis.

* * * * *